Feb. 25, 1969 P. M. KINTNER 3,430,201
EXTENDING PULSE RATE MULTIPLICATION CAPABILITY OF SYSTEM THAT INCLUDES GENERAL PURPOSE COMPUTER AND HARD-WIRED PULSE RATE MULTIPLIER OF LIMITED CAPACITY
Filed June 16, 1967
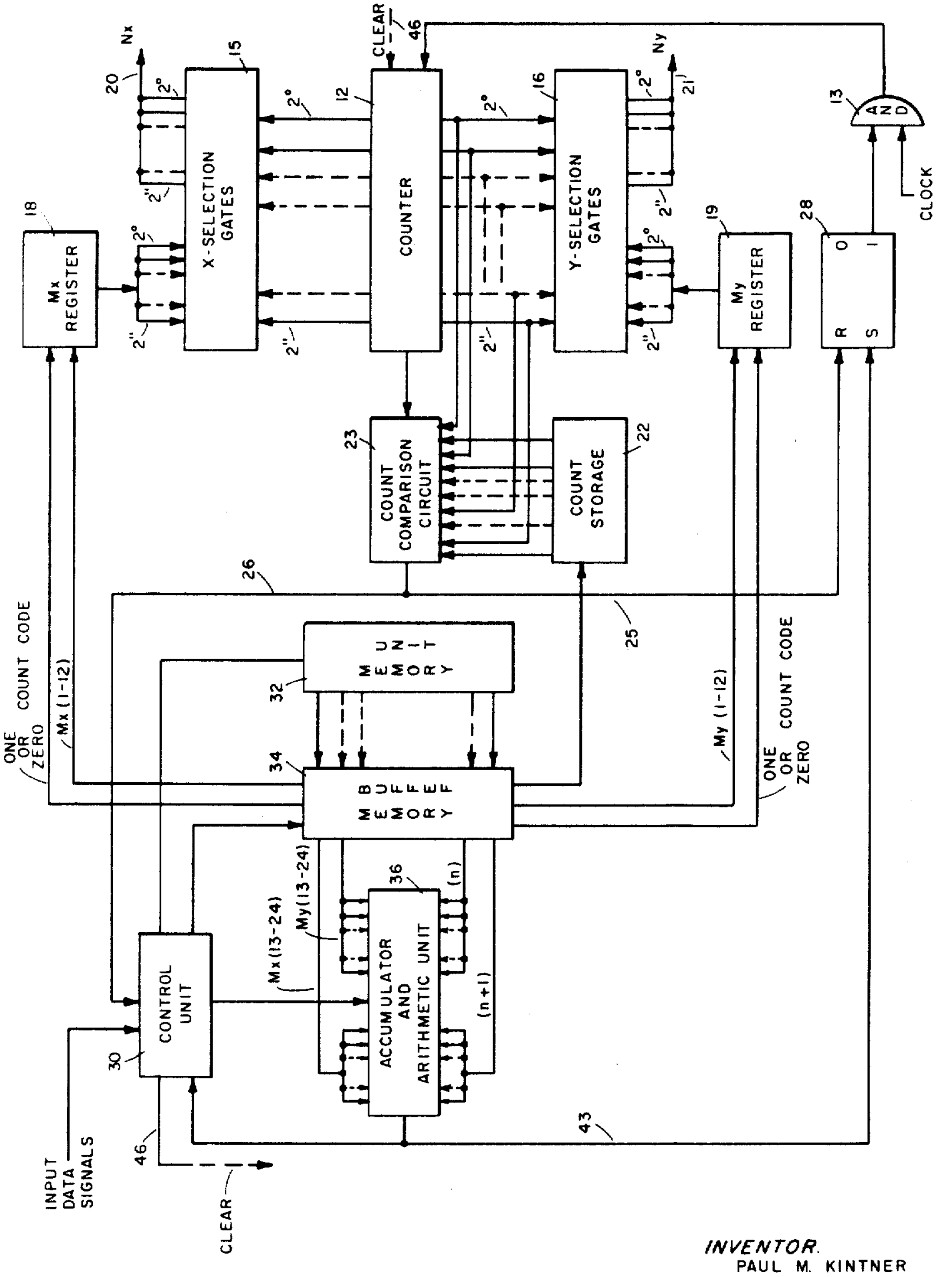
INVENTOR.
PAUL M. KINTNER
BY [signature]
ATTORNEY.

United States Patent Office 3,430,201
Patented Feb. 25, 1969

3,430,201

EXTENDING PULSE RATE MULTIPLICATION CAPABILITY OF SYSTEM THAT INCLUDES GENERAL PURPOSE COMPUTER AND HARD-WIRED PULSE RATE MULTIPLIER OF LIMITED CAPACITY

Paul M. Kintner, Huntington Station, N.Y., assignor to Cutler-Hammer Inc., Milwaukee, Wis., a corporation of Delaware Filed June 16, 1967, Ser. No. 646,524
U.S. Cl. 340—172.5 6 Claims
Int. Cl. G11b *13/00*

ABSTRACT OF THE DISCLOSURE

Electronic control apparatus including as a portion thereof a stored program general purpose computer for performing logical and arithmetic operations on input data. Another portion of said control apparatus operates according to operational-digital techniques and includes hard-wired circuitry of limited pulse counting capacity for performing a pulse rate multiplication operation on pulses of the limited count. A pulse rate multiplication operation is performed on a pulse count that exceeds the capacity of the hard-wired circuitry by incorporating the use of the stored program general purpose computer which operates in response to overflow pulses of the hard-wired circuitry. The computer is programmed to perform computer operations that are equivalent to pulse rate multiplication operations that would be performed on higher order bit positions of a larger pulse count, had hard-wired circuitry been employed to provide a pulse rate multiplier of greater counting capacity.

*Background of the invention*

The present invention will be described as it might be used in an electronic control system utilizing operational-digital techniques to automatically control the drawing of an automatic drafting table in response to information signals supplied to the system. Information signals may originate from magnetic or paper tape, and may be converted to appropriate binary digital signals by suitable computer apparatus, if not already in that form.

The movement of the drawing pen is controlled by $x$-axis and $y$-axis motors which are actuated by respective series of unitary-weighted discrete pulses or bits. The rate and number of pulses received by a motor determines the velocity and distance of travel of the pen in the corresponding direction. As one specific example of the operation of an automatic drafting table, data signals representing coordinates of points on a plan view drawing of a mechanical part or device may be coupled into the digital system where they are operated upon by a stored program general purpose computer and other apparatus to produce two output series of pulses which cause the drafting table apparatus to draw an angular projection view of that part or device.

A discussion of the use and advantages of operational-digital techniques in automatic control systems is contained in an article entitled, "Adapting Digital Techniques for Automatic Controls," by B. M. Gordon, published in Electrical Manufacturing, November 1954, beginning on page 136. As pointed out in that article, an electronic circuit known as a pulse rate multiplier is an important and frequently used circuit in systems utilizing operational-digital techniques. A circuit of this type receives a pulse series as one input, a numeric code representing a fractional multiplier as a second input, and produces an output series of pulses whose number is equal to the product of the number of input pulses (the multiplicand) and the numeric code (the fractional multiplier). A pulse rate multiplier circuit is comprised of a plurality of cascaded flip-flop or scaler circuits that function as a conventional binary counter, each stage of which issues a non-carry pulse upon the receipt of a first pulse of a pair of pulses from the immediately preceding stage, and a carry pulse upon receipt of the second pulse of the pair. Also included are a plurality of two-input gate circuits. One input to each gate is a non-carry signal from a respective counter stage, and the other input to a gate is a correspondingly weighted binary bit of the numeric code multiplier. The bit signals of the coded fractional multiplier open or close the respective gates depending on whether they are a binary one or zero, to allow correspondingly weighted non-carry pulses to pass through open gates. All pulses passed through the gates are combined to produce the output series of pulses that represents the product of the input series of pulses and the coded fractional multiplier.

In an automatic drafting table of the type referred to above, one output pulse from a rate multiplier may cause the pen to move one thousandth of an inch in a given direction. An extremely large count of pulses occurring in a very short period of time is required to rapidly move the pen a distance of twenty or more inches, for example. A counter that would be required in a binary rate multiplier to accommodate a count corresponding to a pen movement of twenty or more inches would require an extremely large number of scaler stages in a hard-wired counter circuit. A hard-wired pulse rate multiplier with the required number of stages would be expensive, would occupy considerable space, and would appreciably increase its susceptibility to failure.

As used herein, the expression "hard-wired circuitry" means electronic circuitry built by conventional wiring techniques in which physical wires or leads are soldered or otherwise permanently joined to circuit components or junction points, and the circuitry responds to a fixed type of input to always perform the same circuit operation. This type of circuitry also sometimes is referred to in the art as "hardware" as opposed to computer "software" which includes programs and operational techniques.

It was mentioned previously that it is contemplated that the automatic drafting table system will include a stored-program general purpose computer. It is conceivable that the computer could be programmed to perform the entire binary rate multiplication operation, but the smaller computers which, because of price considerations, are appropriate for use with an automatic drafting table, cannot produce $x$-axis and $y$-axis output pulse series having high enough pulse repetition frequency to cause the drafting pen to move at the desired speeds for some applications.

*Summary of the invention*

The present invention overcomes the above-mentioned disadvantages by combining a general purpose computer and a fast-acting, hard-wired binary rate multiplier of limited capacity. The hard-wired circuitry is used to perform the binary rate multiplication operation on the lower significant bit positions of a pulse count of received pulses which change binary values at a high rate, and the computer performs an operation which is equivalent to binary rate multiplication for the higher significant bit positions which change binary values at much lower rates.

*Brief description of the drawing*

The invention will be described by referring to the accompanying drawing which is a simplified block diagram of the apparatus employed in carrying out the invention.

*Description of the preferred embodiments*

Referring now in detail to the accompanying drawing, the portion of the apparatus that is comprised of hard-wired circuit components that function as a twelve stage pulse rate multiplier is shown in simplified form in the right-hand portion of the drawing, and a portion of the stored program general purpose computer is illustrated in simplified form in the left-hand portion of the drawing. The hard-wired pulse rate multiplier 10 is the type described in the above-mentioned publication and in U.S. Patent 2,910,237, issued Oct. 27, 1959. In one embodiment of the invention the pulse rate multiplier was comprised of a twelve stage binary counter 12 which operated in the conventional manner to accumulate a binary count of the number of input pulses passed through AND gate 13 from a clock pulse source. The series of pulses need not be regularly occurring as they would be from a clock source, but could just as well be intermittently occurring pulses.

Non-carry pulses from each of the binary stages $2^0$ through $2^{11}$ of the counter are coupled to a respective one of twelve *x*-selection gates 15, and to a respective one of a similar group of twelve *y*-selection gates 16. The second input to each gate of a group is a respective bit signal of a coded twelve-bit fractional multiplier $M_x$ or $M_y$. The various *x*-selection gates are either open or closed in accordance with the binary value of the corresponding bit position of the coded fractional multiplier $M_x$ stored in the twelve bit $M_x$ register 18. A binary one in a bit position of the coded multiplier $M_x$ opens a gate to allow pulses from corresponding bit positions of the counter to couple to output line 20. All pulses passed by *x*-selection gates 15 combine on the common output line 20 to form an output series of unitary-weighted pulses $N_x$ whose total number is equal to the product of the count of pulses in the counter 12 and the fractional multiplier $M_x$.

The series of output pulses $N_x$ are coupled to an *x*-axis motor on the automatic drafting table to move the pen in a direction parallel to the *x*-axis on the table. The rate and distance of travel of the pen is a function of the rate and number of pulses of the series $N_x$.

The *y*-selection gates 16 function in a similar manner in response to the fractional multiplier $M_y$ in register 19 to supply to output line 21 an output series of pulses $N_y$ to move the pen in a direction parallel to the *y*-axis on the table.

The coded multipliers $M_x$ and $M_y$ are supplied from the computer and may result from computations performed by the computer in transforming input data representing coordinates of points on lines of a plan view drawing of a mechanical device, for example, to corresponding digital data representing coordinates of points on a projection view drawing of the device which is to be drawn by the automatic drafting table. The multipliers $M_x$ and $M_y$ continually change during a drafting operation to cause the pen to change directions as required.

As described, counter 12 is a twelve stage binary counter having a capacity to accumulate a total count of 4095 before resetting to zero. Because many more pulses than this must be handled in performing the pulse rate multiplication operation, a pulse must be coupled to the computer portion of the apparatus to direct its operation each time counter 12 reaches its capacity count. In some instances it may be desirable to couple pulses to the computer portion of the apparatus when some designated count has been reached, but before counter 12 actually reached its maximum capacity count. Either of these contingencies may be provided for by providing means for recognizing when a desired count has been accumulated in counter 12, whether it is the maximum capacity count or a lesser count. This may be accomplished by setting a binary digital number representing the desired count into the count storage register 22 and comparing this stored count in comparison circuit 23 with the count accumulated in counter 12. Comparison circuit 23 operates in parallel fashion to compare corresponding bits of the two numbers, and when the count from counter 12 equals the desired count in storage register 22, which in this example is a count of 4095, a pulse is coupled over line 25 to reset flip-flop 28 to its zero condition, whereby its one output line is deenergized so that AND gate 13 is disabled and prevents any further clock pulses from coupling to the input of counter 12.

The output pulse from coincidence circuit 23 also is coupled over line 26 to control unit 30 of the computer. One of the functions performed by control unit 30 at this time is to issue a clear pulse which is coupled to counter 12 to clear its stages and reset it to zero count.

For the purpose of the present discussion, the output pulse of comparison circuit 23 will be called an "overflow" pulse since, in the example, it is the maximum count of 4095 in counter 12 that compares with the count stored in storage register 22 to produce the pulse on line 26. However, as mentioned previously, a lesser count may be chosen, so that it should be understood that the term "overflow pulse" as used herein and in the attached claims is intended to include both situations.

A maximum count of 4095 pulses on an output line $N_x$ or $N_y$ will cause the pen on the drafting table to move a maximum distance of approximately 4 inches, the drawing on the drafting table being made up of successive 4 inch segments. Because the pen on the drafting table must be able to draw lines in excess of four inches in length, the electronic apparatus must be capable of handling pulse counts in excess of 4095. A counter of twenty-four stages would provide adequate capacity, but the additional hardware that would be required for twelve additional hard-wired stages would add to the cost and bulk of the device, and would reduce its reliability. Inasmuch as a stored program general purpose computer already is being utilized to perform computations and operations on the input data, it can be programmed to operate on the overflow pulses from counter 12 to perform operations that are equivalent to the functions that would be performed by higher order stages 13 through 24 of a twenty-four stage hardware pulse rate multiplier. The general purpose computer then can cause pulses to be supplied to output lines $N_x$ and $N_y$ that are equivalent to pulses that would be supplied from *x* and *y* selection gates of stages 13 through 24 of a hard-wired pulse rate multiplier. If these pulses were not supplied, the numbers of pulses in output series $N_x$ and $N_y$ would be in error by progressively greater numbers as the pen of the drafting table moved along a progressively greater number of four inch segments, thus reducing the accuracy and usefulness of the automatic drafting table. The operation of the computer is tied-in with the hard-wired portion of the pulse rate multiplier in the following manner.

The computer portion of the system is illustrated in simplified form by showing the conventional major units of a stored program general purpose computer. Control unit 30 coordinates the operation of all of the components of the computer so that events occur in a logical sequence and at the proper times. Memory unit 32 stores numerically-encoded instructions for the control unit, the encoded data which are to be processed, addresses, and contains facilities for storing data generated by the computer itself. Input data signals, in appropriate form, are coupled to control unit 30, and then stored in memory unit 32. Memory unit 32 includes means for storing the coded count ($n$) of the number of overflow pulses received on line 26 from comparison circuit 23, as well as the coded representation of one count more ($n+1$) than the number of overflow pulses received. These counts ($n$) and ($n+1$) in memory unit 32 are incremented by one count each time an overflow pulse is received. Memory unit 32 also stores the least significant bits $M_{x(1-12)}$ and $M_{y(1-12)}$ of the coded fractional multipliers that are supplied to the respective groups of twelve $x$ and $y$ selection gates 15 and 16 in the hard-wired portion of the apparatus. It also stores the most significant bits $M_{x(13-24)}$ and $M_{y(13-24)}$ of the coded fractional multipliers which are supplied to the accumulator and arithmetic unit 36 of the computer.

Memory buffer 34 is a twelve stage flip-flop register that handles in parallel fashion all information going into and out of the memory unit 32. For simplicity of illustration, a number of different single output lines are shown coming from memory buffer 34. In practice, it provides at any one time one twelve-bit output on twelve parallel lines. The various outputs shown in the accompanying illustration are provided at different times, and are routed by appropriate switching arrangements to the hardware and computer units indicated.

Accumulator and arithmetic unit 36 includes a twelve-bit accumulator register which, under programmed command of the control unit 30, can be cleared, incremented, complemented, and its contents can be rotated right or left. The arithmetic unit is capable of performing various arithmetic and logical operations on the contents of the accumulator register. For example, it can perform a parallel AND operation on the twelve bits in the accumulator and a twelve-bit digital number introduced from memory buffer 34. The results of operations performed by the arithmetic unit normally are retained in the accumulator until cleared therefrom on command from control unit 30.

The operation of the computer portion of the apparatus is based on the following considerations. If higher order stages 13 through 24 of a binary rate multiplier actually used hard-wired circuitry similar to that of the lower order stages 1 through 12, a pulse would be issued from a higher order stage to the output series $N_x$ or $N_y$ each time one of the higher order stages of the counter transferred from a binary zero to a binary one, provided the correspondingly weighted bits of the respective fractional multipliers $M_x$ and $M_y$ were a binary one. The computer is programmed to perform operations which will furnish the required pulses to the respective output series $N_x$ and $N_y$, although it does not perform the same operations that are performed by a hard-wired pulse rate multiplier.

Overflow pulses from comparison circuit 23 are coupled over line 26 to control unit 30 which causes a twelve-bit count stored in memory unit 32 to be incremented to keep track of the number of overflows $(n)$. The count of one more than the number of overflows $(n+1)$, that is stored in memory unit 32 also is incremented by control unit 30 on the receipt of each overflow pulse. By knowing what the present count of overflow pulses is, and what the next count will be, it is possible to determine whether a binary zero is in a bit position of the present count and whether it is about to change to a binary one. Only one bit position at a time will change in this manner. Having this information, and knowing the bit values for bit positions 13 through 24 of the fractional multipliers $M_x$ and $M_y$, it can be determined that pulses should or should not be added to output series $N_x$ and/or $N_y$ upon receipt of the next overflow pulse. The computer portion of the apparatus performs the above-described operations by first comparing the count $(n)$ with the count $(n+1)$ to identify a bit position of the count $(n)$ that now is a binary zero and will change to a binary one on the next overflow pulse. This is accomplished in the programmed computer by control unit 30 commanding memory unit 32 to transfer the count $(n)$ to memory buffer 34, and then causing it to be entered into the 12 stage accumulator register of accumulator and arithmetic unit 36. Assuming, for example, that the count $(n)$ is equal to the decimal number 107, the binary number entered into the accumulator of unit 36 would be $$n=0\ 0\ 0\ 0\ 0\ 1\ 1\ 0\ 1\ 0\ 1\ 1$$

This number is then complemented in the accumulator and compared in parallel fashion with the count $(n+1)$ which is brought from memory unit 32 on command from control unit 30. The comparison is accomplished by performing a logical AND operation on corresponding bit positions of the two numbers, in the following manner.

| | |
|---|---|
| $(\bar{n})$ | 1 1111001010 0 |
| $(n+1)$ | 0 0000110110 0 |
| $(\bar{n})$ AND $(n+1)$ | 0 0000000010 0 |

The binary one in the third bit position from the right of the resultant number indicates that the bit position of the count $(n)$ now is a binary zero and will transfer to a binary one on receipt of the next overflow pulse.

The result of this comparison is retained in the accumulator of unit 36 and next is compared, by a parallel bit-by-bit AND operation, with $M_{x(13-24)}$ which is brought from memory unit 32 on programmed command from control unit 30. This operation is represented as follows, wherein an assumed coded binary digital number is used to represent $M_{x(13-24)}$.

| | |
|---|---|
| $(\bar{n})$ AND $(n+1)$ | 0 0000000010 0 |
| $M_{x(13-24)}$ | 0 0001100110 1 |
| $(\bar{n})$ AND $(n+1)$ AND $M_{x(13-24)}$ | 0 0000000010 0 |

The binary one in the third bit position from the right of the resultant number indicates that a pulse should be added to the output series $N_x$.

Control unit 30 is programmed to next command memory unit 32 to supply to memory buffer 34 a twelve-bit one-count code that is coupled to the $M_x$ register 18. The one-count code sets the $x$-selection gates 15 so that when the next pulse is coupled to counter 12 and AND gate 13, an incrementing output pulse will be added to the output series $N_x$.

After the computer apparatus operates as just described to determine whether a pulse is to be added to the output series $N_x$, it is programmed to perform substantially the same operations with the fractional multiplier $M_{y(13-24)}$ to determine whether a pulse is to be added to the output series $N_y$.

At the same time that the one-count code is being set in the $M_x$ and $M_y$ registers 18 and 19, an output pulse from accumulator and arithmetic unit 36 is coupled over line 43 to set flip-flop 28 in its one condition. The output of flip-flop 28 now enables AND gate 13 and allows the next clock pulse to couple to counter 12. It is this input pulse which causes an incrementing pulse to be added to the output lines $N_x$ and $N_y$, as determined by the computer portion of the apparatus in the manner described above.

At the same time that the one count codes are set into $M_x$ and $M_y$ registers 18 and 19, a count of one is set in count storage register 22 so that it will compare in comparison circuit 23 with a count of one in counter 12. When this occurs, an output pulse couples over line 26 to control unit 30, which is programmed to issue a clear pulse on line 46 which clears counter 12, and inserts new data into $M_x$ and $M_y$ registers 18 and 19, and into count storage register 22. At this same time, the overflow pulse resulting from the one-count comparison circuit 23 is coupled over line 25 to reset flip-flop 28 to disable AND circuit 13 and prevent clock pulses from coupling to counter 12.

If the accumulator and arithmetic unit 36 had determined that no additional pulse was to be added to $N_x$, for example, a no-count code would have been set in $M_x$ register 18 and no pulse would pass through the appropriate $x$-section gate upon receipts of the next clock pulse by counter 12. Similarly, a no-count code would be set in $M_y$ register 19 by the computer if no incrementing pulse is to be added to the $N_y$ output series of pulses on line 21.

As part of the clearing operation, accumulator and arithmetic unit 36 is commanded to issue a pulse on line 43 which sets flip-flop 28 to its one condition so as to enable AND gate 13 and permit it to pass pulses to counter 12 which then commences a new count.

The series of output pulses $N_x$ and $N_y$ on output lines 20 and 21, respectively, are coupled to the *x*-axis and *y*-axis motors on the automatic drafting table and cause the drawing pen to draw the desired sketch on the drafting table.

It will be obvious to those skilled in the art that other arrangements may be provided for adding the incrementing pulses commanded by the computer to the output series of pulses $N_x$ and $N_y$. For example, the computer pulse of the apparatus may directly issue the incrementing pulses which then may be added to the output series $N_x$ and $N_y$ rather than the computer operating to insert one count or zero count codes to the respective $N_x$ register 18 and the $N_y$ register 19.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. In a pulse rate multiplier that receives a series of input pulses and produces a number of output pulses that is a fraction of the number of said input pulses, said pulse rate multiplier including a pulse counter that produces an overflow pulse at a given count but has a capacity of counting a fewer number of input pulses than desired in some operations, whereby a required number of output pulses is not produced in response to a desired number of input pulses, the improvement of providing additional pulse rate multiplication capability to produce a required number of output pulses, comprising means responsive to input data signals for providing a multi-bit encoded digital signal representing a fractional multiplier, said encoded digital signal including lower order bits which control the pulse rate multiplier to determine the number of output pulses produced in response to a number of input pulses and including higher order bits whose orders are in excess of the orders of bit positions of a pulse count that can be correctly operated on by the pulse rate multiplier, means responsive to overflow pulses of the pulse rate multiplier and to said higher order bits of the encoded digital signal for producing incrementing pulses corresponding to pulses that would be produced by higher order positions of a pulse rate multiplier having a capacity to correctly operate on an accumulated count of pulses having the number of bit positions of the encoded fractional multiplier.

2. In a system that includes a hard-wired pulse rate multiplier and a general purpose computer that controls said pulse rate multiplier to produce a series of output pulses, wherein the capacity of said hard-wired pulse rate multiplier is insufficient to produce the number of output pulses required in some operations of the system, the improvement of providing additional pulse rate multiplication capability to produce a required number of output pulses, comprising means for coupling input pulses to said pulse rate multiplier, means for issuing an overflow pulse when a given number of pulses has been received by said pulse rate multiplier, said computer means responding to input data signals to produce an encoded multi-bit binary digital number representing a fractional multiplier having a certain relationship to input data signals, means including said computer means responding to said encoded digital number and to said overflow pulses and producing an incrementing pulse each time the binary value in a bit portion of a binary count of overflow pulses changes from a zero to a one and the binary value in the corresponding bit position of the encoded digital number is a given binary value, and means for combining said incrementing pulses with the pulses of said output series.

3. In a system that includes a hard-wired pulse rate multiplier and a general purpose computer that controls said pulse rate multiplier to produce a series of output pulses that is a selectable fraction of the number of input pulses supplied to the pulse rate multiplier, wherein the pulse rate multiplier includes a pulse counter that produces an overflow pulse at a given count but has a capacity of counting fewer number of input pulses than desired in some operations, whereby a required number of output pulses is not produced in response to a desired number of input pulses, the improvement of providing additional pulse rate multiplication capability to produce the required number of output pulses, comprising means for coupling said general purposes computer to receive said overflow pulses, said computer being actuated by overflow pulses and producing in response thereto first and second multi-bit binary digital signals representing respectively the present count of overflow pulses and one count more than the present count of overflow pulses, said computer comparing the binary values in corresponding bit positions of the two digital signals and producing a multi-bit resultant binary digital signal having a unique value in a bit position whose order of significance is the same as the corresponding bits in said first and second digital signals whose respective values are zero and one, said computer producing a multi-bit coded binary digital signal representing said selectable fraction, means including said computer for comparing said bit position of unique value with a corresponding bit position of the coded digital signal and producing an output incrementing pulse when the corresponding bit position of the coded digital signal is a predetermined binary value.

4. The combination claimed in claim 3 wherein said computer includes means for producing the first and second binary digital signals which comprises, first and second counting means, means for incrementing each of said counting means in response to each received overflow pulse, the second one of said counting means being constructed and operated to register one count more than the count in said first counting means,

5. The combination claimed in claim 3 wherein said computer includes digital signal comparing means which comprises, an accumulator register for temporarily storing said first binary digital signal, means for complementing the binary bits of said first binary digital signal stored in the accumulator register, means performing an AND operation on the complemented bits of the first binary digital signal and corresponding bits of the second binary digital signal to produce said resultant digital signal, said resultant digital signal being retained in said accumulator register.

6. The combination claimed in claim 3 wherein said means producing output incrementing pulse includes, means for performing a parallel bit-by-bit AND operation on said resultant digital signal and said coded digital signal to produce a pulse command signal when corresponding bits of said resultant encoded digital signals are of a given binary value, means including said pulse rate multiplier responsive to said pulse command signals for issuing an incrementing pulse which is included with said output pulses.

References Cited

UNITED STATES PATENTS

| | | |
|---|---|---|
| 3,359,406 | 12/1967 | Perry. |
| 3,345,618 | 10/1967 | Threadgold. |
| 3,312,953 | 4/1967 | Wang et al. |
| 3,305,842 | 2/1967 | Oya. |
| 3,302,183 | 1/1967 | Bennett et al. |
| 3,278,906 | 10/1966 | Gountanis et al. |
| 3,247,488 | 4/1966 | Welsh et al. |
| 3,274,376 | 9/1966 | Evans et al. |
| 3,153,224 | 10/1964 | Taylor. |

GARETH D. SHAW, *Primary Examiner.*

U.S. Cl. X.R.

235—92, 156